United States Patent [19]

Šipek et al.

[11] 4,176,962
[45] Dec. 4, 1979

[54] METHOD FOR DETERMINING A STRAIGHT LINE INTERSECTING THE AXIS OF AN OPTICAL RADIATION BEAM OF A PHOTOELECTRIC LEVELLING APPARATUS AND ARRANGEMENT FOR EXECUTION OF THIS METHOD

[75] Inventors: Emil Šipek; Tomislav Šimeček, both of Prague, Czechoslovakia

[73] Assignee: Ceskoslovenska akademie ved, Prague, Czechoslovakia

[21] Appl. No.: 847,750

[22] Filed: Nov. 2, 1977

[30] Foreign Application Priority Data

Nov. 11, 1976 [CS] Czechoslovakia ............... 7273-76
Nov. 11, 1976 [CS] Czechoslovakia ............... 7274-76
Sep. 21, 1977 [CS] Czechoslovakia ............... 6124-77

[51] Int. Cl.² ............................................. G01B 11/26
[52] U.S. Cl. ............................................... 356/400
[58] Field of Search ............ 356/156, 167, 172, 375, 356/400

[56] References Cited

U.S. PATENT DOCUMENTS

| | | | |
|---|---|---|---|
| 3,129,335 | 4/1964 | Stewart | 356/172 |
| 3,604,940 | 9/1971 | Matthews | 356/167 |
| 3,730,633 | 5/1973 | Kennedy | 356/167 |
| 3,900,738 | 8/1975 | McKay | 356/156 |
| 3,945,730 | 3/1976 | Simecek et al. | 356/172 |

FOREIGN PATENT DOCUMENTS 2448571 4/1975 Fed. Rep. of Germany ........... 356/156

*Primary Examiner*—John K. Corbin
*Assistant Examiner*—R. A. Rosenberger
*Attorney, Agent, or Firm*—Burgess, Ryan and Wayne

[57] ABSTRACT

Method for determination of a straight line intersecting the axis of an optical radiation beam of a photoelectric levelling apparatus where the optical radiation beam transmits power from a stable radiation transmitter to a stable radiation receiver by screening the optical radiation beam by a screen and by evaluation of the signal detected by the radiation receiver by means of an evaluation circuit wherein the optical radiation beam is screened by screening means from at least two different sides of the optical radiation beam subsequently in mutually symmetrical positions of the screening means at a simultaneous indication from which side the optical radiation beam is screened, the evaluation circuit is evaluating the magnitude of the signal detected by the radiation receiver in case of screening from different sides of the optical radiation beam and by shifting the screening means transverse to the optical radiation beam the position is found. When the signals detected by the radiation receiver at screening from different sides are of the same magnitude, then the axis of symmetry of curves which form screening edges of the screening means in mutually symmetrical positions of the screening means represents the straight line intersecting the axis of the optical radiation beam.

7 Claims, 3 Drawing Figures

METHOD FOR DETERMINING A STRAIGHT LINE INTERSECTING THE AXIS OF AN OPTICAL RADIATION BEAM OF A PHOTOELECTRIC LEVELLING APPARATUS AND ARRANGEMENT FOR EXECUTION OF THIS METHOD

BACKGROUND OF THE INVENTION

The invention relates to a method for determining a straight line intersecting the axis of an optical radiation beam of a photoelectric levelling apparatus, where the optical radiation beam transmits power from a stable radiation transmitter to a stable radiation receiver and by screening the optical radiation beam and by evaluation of the signal detected by the radiation receiver. The invention relates furthermore to an arrangement for execution of this method.

One of known arrangements for photoelectric levelling is based on a method of the measuring the distance from a straight reference line inside the optical radiation beam, the line being determined by screening this beam by screening means to a constant value of the signal detected by the radiation receiver.

Another known arrangement for photoelectric levelling is based on the method of a simultaneous screening of two parallel optical radiation beams by a single common screen. By this method an optical straight reference line is determined, which is the axis of symmetry of both optical radiation beams, by screening both beams to the same depth by a common screen.

A drawback of both said methods and arrangements is primarily that the accuracy of determination of the optical straight reference line depends on the stability of the intensity of the transmitted optical radiation beam, so that in case of a variation of this intensity also the values corresponding to a certain position of the screening screen are varying, reducing the accuracy of the whole arrangement for photoelectric levelling. A drawback of the second mentioned method and arrangement for photoelectric levelling is the necessity of application of two optical radiation beams and the necessity of an independent detection of both these optical radiation beams, where for instance collimated laser radiation beams have to be used for spatial separation of the optical radiation beams.

SUMMARY OF THE INVENTION

It is an object of this invention to substantially reduce or eliminate the drawbacks of the above mentioned methods and arrangements for photoelectric levelling and to provide a method and an arrangement enabling to perform accurate levelling measurements using the photoelectric method, which measurements would be independent of the stability of the level of transmission of radiation power between the transmitter and receiver of the radiation beam and independent of the varying transverse dimensions of the Fresnel zones along the measured track, and with high accuracy and sensitivity at any point of a relatively long measuring track, with the possibility of fully automating this process, to register automatically the measuring results and possibly also to utilize the output signal of evaluation circuits for automatic control. This system is thereby practically insensitive both to variations of external illumination and to changes of optical properties of the medium along the measuring track and equally insensitive to the angular stability of optical axes of parts of the arrangement situated at the beginning and the end of the measuring track. The respective arrangement does not require for application of the method according to this invention any delicate optical evaluation elements, whereby the manufacturing costs are low and in addition the arrangement has no components which are subject to rapid wear, so that its service life is relatively long.

The method for determination of a straight line intersecting the axis of an optical radiation beam of a photoelectric levelling apparatus according to this invention is based on screening an optical radiation beam by screening means subsequently from at least two sides of the optical radiation beam in mutually symmetrical positions of the screening means at a simultaneous indication from which side the optical radiation beam is screened. The evaluation circuits evaluate the magnitude of a signal detected by the radiation receiver in case of screening from respective sides of the optical radiation beam and by shifting the screening means in a direction transverse to the optical radiation beam, a position is found where the signals detected by the radiation receiver at a screening from different sides are of the same magnitude, in this case the axis of symmetry of curves, which form screening edges of the screening means in mutually symmetric positions of the screening means coincides with the straight line intersecting the axis of the optical radiation beam.

The arrangement for execution of the method according to this invention has the screening device provided with a position pick-up device of the screening means. The positioning and driving mechanism of the screening means is adapted for symmetrical screening the optical radiation beam by the screening means from at least two sides. The screening means are provided with screening edges adapted so that curves of the said screening edges pass subsequently through mutually symmetrical positions. The evaluating circuit is provided with inputs for signal reception and with at least one signal output and it is adapted for evaluating differences and/or sums of output signals of the radiation receiver in mutually symmetrical positions of the screening means, one of the said inputs is connected to an output of the radiation receiver. The position pick-up device of the screening means is provided with a signal output and adapted for detection of positions of screening edges of the screening means, and the said signal output is connected to the respective input of the said evaluating circuit. The positioning and driving mechanism of the screening means may be adapted for actuating the screening means in a direction transverse to the optical radiation beam and provided with a shaft imparting a rotary motion to the screening means, and it is situated so that the axis of the said shaft passes through an area limited by the optical radiation beam between the radiation transmitter and radiation receiver. The screening means may be formed by a screening blade, in this case the said screening blade is provided with a screening edge and it is fixed to the shaft of the positioning and driving mechanism of the screening means eccentrically with respect to the axis of rotation of the shaft in a plane passing through this axis. The said screening edge is parallel or concurrent with this axis. The screening means may consist of two screening elements of the shape of cylinder sectors. The positioning and driving mechanism of the screening means is in this case adapted for actuating the said screening elements of the shape of cylinder sectors in a direction transverse to the optical radiation beam and it is provided with two shafts imparting a rotary motion to the screening elements of the shape of cylinder sectors at equal angular speed. The said shafts, onto which the screening elements are fixed, are situated at opposite sides of the optical radiation beam, the distance of their axes is approximately equal to the sum of the radii of the cylinder sectors and in a position when the axis of the central angle of one cylinder sector is perpendicular to the axis of the optical radiation beam, the axis of the central angle of the other cylinder sector is oriented in the same direction. The screening means may also consist of two bodies provided with the same number of screening blades. In this case each of the screening blades is provided with a screening edge on the side being distant from the body of the screening means. The positioning and driving mechanism of the screening means is adapted for actuating these bodies of screening means with the screening blades in a direction transverse to the axis of the optical radiation beam, and it is provided with two shafts imparting a rotary motion to the bodies of the screening means at equal angular speed. The said shafts, onto which the bodies of the screening means are fixed, are situated on opposite sides of the optical radiation beam, their axes distance being approximately twice the distance of the axis of rotation of the body of the screening means from the screening edge of the screening blade. Each of the bodies of the screening means may be provided with at least one other screening blade. In this case the said other screening blade is radially longer for at least one half of the transverse dimension of the optical radiation beam and its axial width is at the maximum half of the remaining radially shorter blades. The radially longer blades are provided on one of their sides with a screening edge, the number of these radially longer blades is on both bodies of the screening means equal and their position is adjusted so that lateral screening edges of these blades are on opposite sides at the same distance from the plane passing through the center of radially shorter screening blades.

The main features and the application of this invention will be in the following explained on hand of exemplary embodiments of the object of this invention shown in attached drawings.

Figure 1:
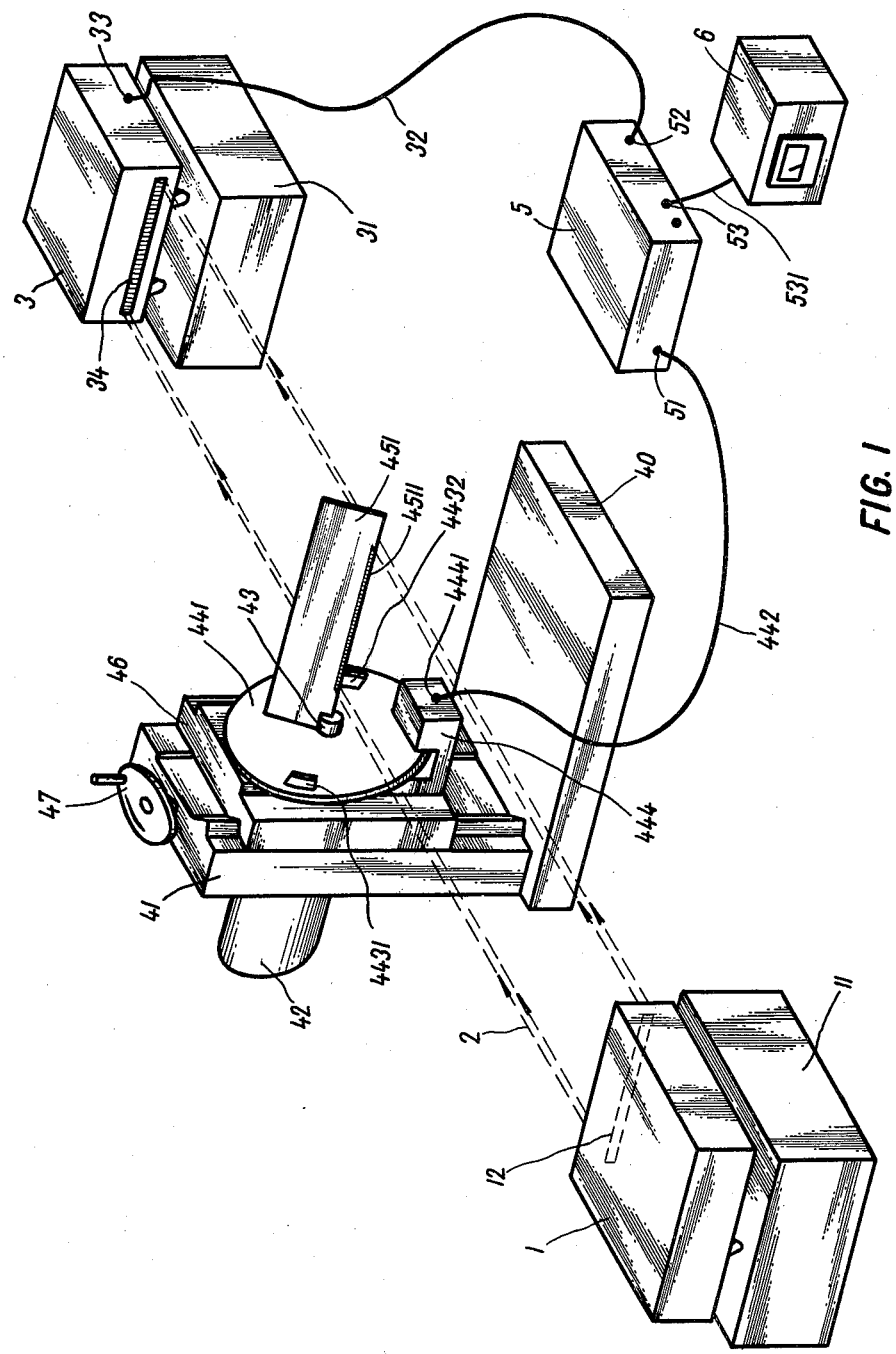
FIG. 1 is a diagrammatical view of an arrangement for determination of a straight line intersecting the axis of an optical radiation beam with screening means formed by a screening blade fixed eccentrically to its rotation axis.

The arrangement shown in FIG. 1 comprises a transmitter 1 of an optical radiation beam 2 and a receiver 3 of the optical radiation beam 2. A screening device is situated between the transmitter 1 of radiation provided with an optical system with an outlet aperture 12 and supported on a stable base 11 at the beginning of the measured track and between the receiver 3 of radiation provided with an input aperture 34 supported on a stable base 31 at the end of the measured track. The said screening device comprises screening means, a positioning and driving mechanism of the screening means, and detection means to detect a position of the screening means. The position and driving mechanism consists of a base plate 40, on which a supporting body 41 is fixed of a slide 46 being slidingly seated on this supporting body 41, operated by a traverse screw terminating in a hand wheel 47, and of a motor 42 fixed on the rear side of the slide 46. The screening means are formed by a blade 451 which is fixed to a shaft 43 of the motor 42 and situated excentrically with respect to the axis of the said shaft 43. The shaft 43 is extending beyond the front side of the slide 46. The detection means of the screening means positions comprise a pick-up disk 441 fixed to the shaft 43 and provided with signal signs 4431 and 4432, and a position pick-up device 444 which is fixed onto the slide 46 on the side of the pick-up disk 441 so that the pick-up disk 441 with signal signs 4431 and 4432 engages between its operating elements. The output 4441 of the pick-up device 444 is via a cable 442 connected to the input 51 of an evaluation circuit 5. The output 33 of the radiation receiver 3 is connected over a cable 32 to a second input 52 of the evaluation circuit 5. A zero position indicator 6 of the vertical slide 46 is connected to the output 53 of the evaluation circuit 5 over a cable 531.

Figure 2:
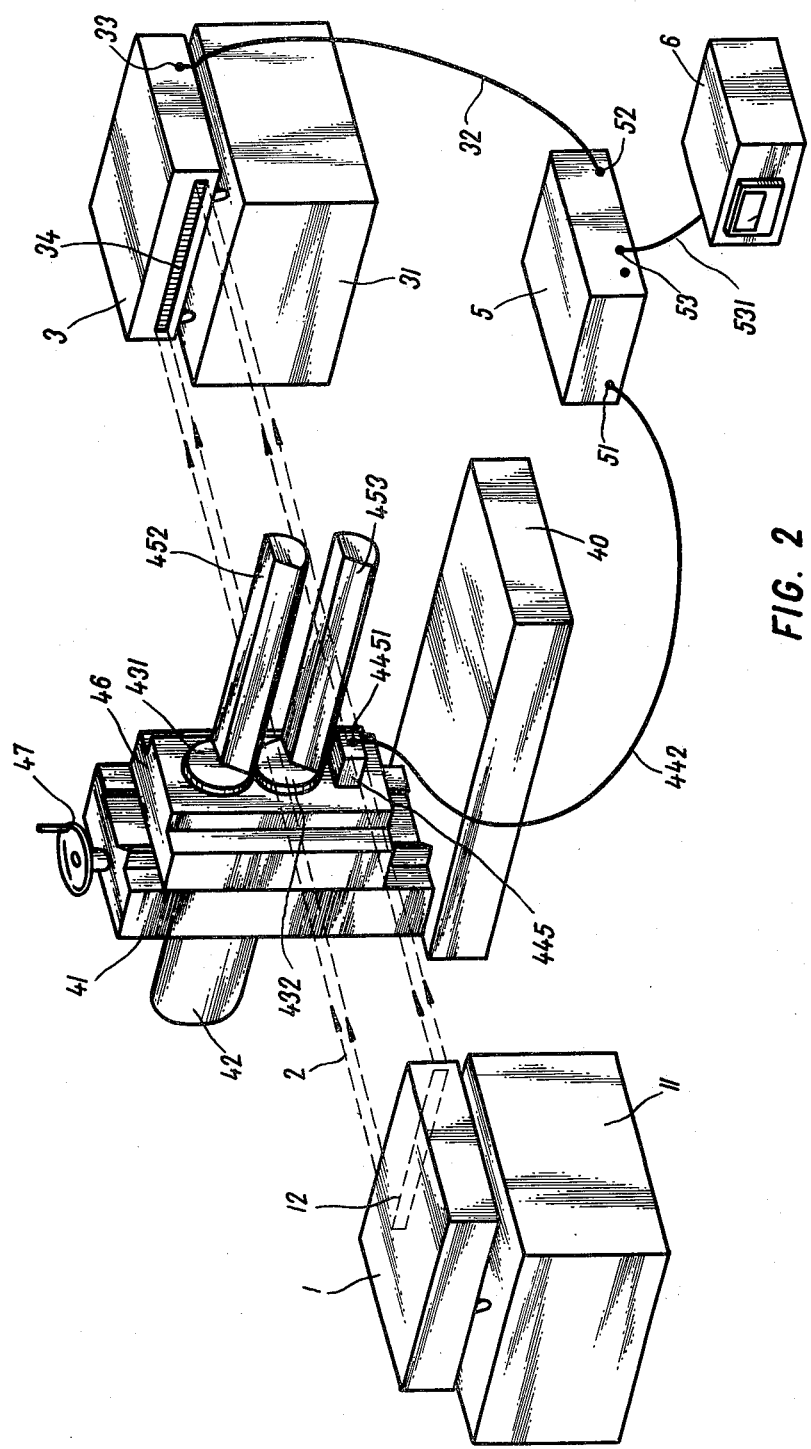
FIG. 2 shows diagrammatically an arrangement, where the screening means is represented by two elements having the shape of cylinder sectors and situated at opposite sides of the optical radiation beam.

Another embodiment of the object of this invention shown in FIG. 2 differs from the just described arrangement shown in FIG. 1 by the arrangement and supporting of the screening means, which is in this case represented by two screening elements 452, 451 of the shape of cylinder sectors fixed coaxially on two parallel shafts 431, 432 of a transmission mechanism and extending on the front side of the slide 46. The screening elements 452, 453 are arranged at different sides of the optical radiation beam 2 and are by means of shafts 431, 432 of the transmission mechanism rotated by the motor 42 at equal angular speed and their mutual position is adjusted, so that in a position where the axis of the central angle of one cylinder sector is perpendicular to the axis of the radiation beam 2, the axis of the central angle of the other cylinder sector is oriented in the same direction. The distance between the shafts 431, 432 is not much different from the sum of radii of the cylinder sectors. The position of the screening elements 452, 453 is picked up by the position pick-up device 445 provided with an output 4451.

Figure 3:
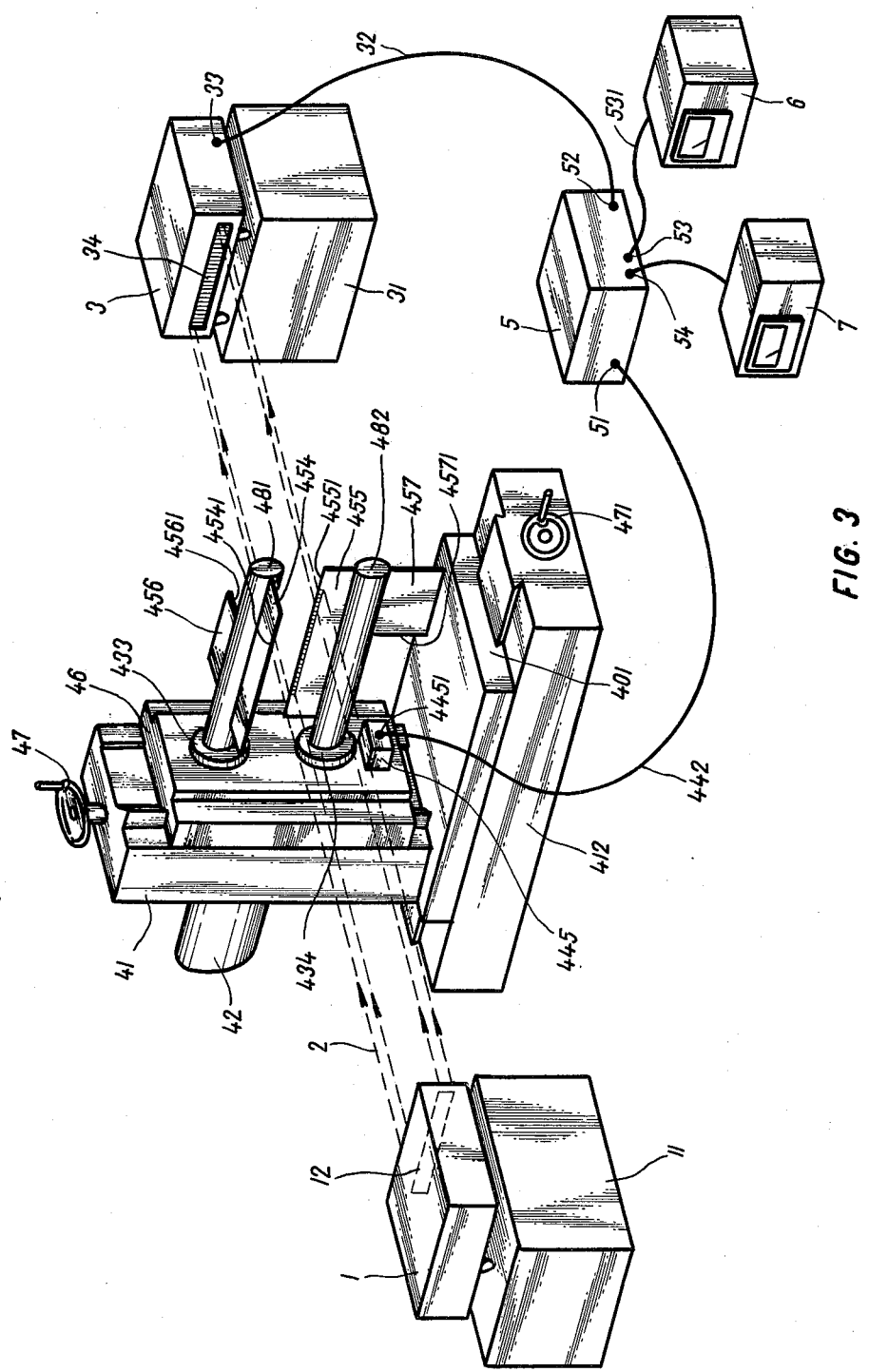
FIG. 3 shows diagrammatically an arrangement according to this invention the screening means being represented by two bodies situated at opposite sides of an optical radiation beam, each of which is provided with two screening blades one of which is in the radial direction shorter, the other one is longer.

The arrangement shown in FIG. 3 is an embodiment of the object of this invention enabling to determine simultaneously two mutually perpendicular straight lines both intersecting the axis of the optical radiation beam 2. It differs from the arrangement shown in FIG. 2 in that the base plate 40 of the screening device is replaced by a horizontal slide 401, slidably supported on a bed 412 and horizontally adjustable by means of a not shown transverse screw terminating in a hand wheel 471. Another change in FIG. 3 is the arrangement of the screening means, represented by two bodies 481, 482 fixed on shafts 431, 432 of a not shown transmission mechanism. The bodies 481, 482 are arranged at different sides of the optical radiation beam 2 and each of them is provided with one radially shorter screening blade 454, 455 and with one radially longer screening blade, the body 481 of the screening means having a radially shorter screening blade 454 with a screening edge 4541 and a radially longer screening blade 456 with a lateral screening edge 4561, the body 482 of the screening means is provided with a radially shorter screening blade 455 which is shown in its working position, i.e. it screens with its screening edge 4551 a part of the optical radiation beam 2 and with a radially longer screening blade 457 with a lateral screening edge 4571. The radially shorter screening blades 454, 455 are situated on bodies 481, 482 of the screening means opposite to the radially longer screening blades 456, 457 so that their screening edges 4541 and 4551 are at the same distance from rotation axis of these bodies. The radially longer screening blade 456 is situated on the body 481 of the screening means in the left half of the optical radiation beam 2, whereas the radially longer screening blade 457 is on the other body 482 of the screening means in an opposite position i.e. in the right half of the optical radiation beam 2. Both bodies 481, 482 of the screening means are rotated by shafts 431, 432 of a transmission mechanism with a motor 42 at equal angular speed. At the moment where one of the screening blades 455, 457 of one body, for instance of body 482 of the screening means engages at the maximum into the optical radiation beam 2, the screening blades 454, 456 of the other body 481 of the screening means are in a position parallel with the axis of the optical radiation beam 2 and do not engage into this optical radiation beam 2. A zero indicator 7 of the position of the horizontal slide 401 is connected to the second output 54 of the evaluation circuit 5.

The arrangement for determination of a straight line intersecting the axis of an optical radiation beam according to the invention in his first embodiment shown in FIG. 1 operates so that in the course of the rotary motion of the screening blade 451 a subsequent screening of the optical radiation beam 2 transmitting power from the stable radiation transmitter 1 to the stable radiation receiver 3 first from one, for instance the upper side, subsequently from the other, for instance the lower side of this optical radiation beam 2 takes place. The radiation receiver 3 currently evaluates and supplies on its output 33 over the cable 32 to the second input 52 of the evaluation circuit 5 a signal proportional to the not screened part of the optical radiation beam 2 by the screening edge 4511 of the screening blade 451, simultaneously the passage of the signal sign 4431 of the pick-up disk 441 between the operating elements of the position pick-up device 444 indicates that the screening blade 451 starts to screen the optical radiation beam 2 from the upper side of this optical beam. Similarly the start of screening of the optical radiation beam 2 from below by the screening blade 451 is indicated by passage of the signal sign 4432 between the operating elements of the position pick-up device 444. The position pick-up device 444 can operate on photoelectric, induction or contact pick-up principle, so that the signal signs are according to individual cases represented by openings, reflecting surfaces, magnetic parts or circuits or as electrically conductive contacts. The signals thus generated by the position pick-up device 444, which provide the information about the instantaneous position of the screening blade 451 are supplied over cable 442 to the first input 51 of the evaluation circuit 5.

The evaluation circuit 5 evaluates from these signals both the mean value of the signal supplied by the radiation receiver 3 in the course of screening of the optical radiation beam 2 by the screening blade 451 from one side of this optical radiation beam 2 and the mean value of the same signal in the course of screening of the optical radiation beam by the screening blade 451 from the other side. A signal proportional to the difference of both above mentioned mean values appears on the output 53 of the evaluation circuit 5. This signal is supplied over cable 531 to the zero position indicator 6 indicating the position of the vertical slide 46. The position of the rotation axis of the screening blade 451 is adjusted by means of the vertical slide 46 so that the zero position indicator 6 shows a zero deflection. In that case the straight line to be determined, which intersects the axis of the optical radiation beam 2 is identical with the ideal rotation axis of the screening blade 451. The deflection of the zero position indicator 6 of the vertical slide 46 is proportional to the deviation of the ideal rotation axis of the screening blade 451 from the axis of the optical radiation beam 2. The sign of the deflection indicates the direction of this deviation.

In addition to a direct determination of small deviations of the rotation axis of the screening blade 451 from the axis of the optical radiation beam 2 since the dependence of the signal at the output 53 of the evaluation circuit 5 on the deviation of the rotation axis of the screening blade from the axis of the optical light beam 2 is linear, it is possible to utilize also the error signal for a servomechanism, automatically maintaining the rotation axis of the screening blade 451 in a position where it coincides with the determined straight line intersecting the axis of the optical radiation beam 2. This servomechanism and its interconnection with the output 53 of the evaluation circuit are not shown in the drawing.

The arrangement for determination of a straight line intersecting the axis of an optical radiation beam according to the invention in the embodiment shown in FIG. 2 operates on the same principle as the embodiment shown in FIG. 1 with the difference, that the optical radiation beam 2 is subsequently screened from one or the other side by the circumference of cylindrical surfaces of screening elements 452, 453 having the shape of cylinder sectors. It is possible to obtain, similarly as in the preceding case, from the signal at the output 33 of the radiation receiver 3 and from the signal from the position pick-up device 445 of the position of screening elements 452, 453 by means of the evaluation circuit 5 at its output 53 a signal having the same properties as in the preceding embodiment. The determined straight line is in this case identical with the axis of symmetry of rotation axes of both screening elements 452, 453 having the shape of cylinder sectors providing these sectors have equal radii.

The arrangement for simultaneous determination of two mutually perpendicular straight lines both intersecting the axis of an optical radiation beam 2 according to this invention in the embodiment shown in FIG. 3 operates similarly as the arrangement shown in FIG. 1 with the difference that in the course of the rotary motion of bodies 481, 482 of the screening means a screening of the optical radiation beam 2 takes place subsequently from different sides, i.e. first from the bottom, from the top, from right and left, so that the evaluation circuit 5 evaluates from the signal at the output 33 of the radiation receiver 3 and from the signal of the position pick-up device 445 of the position of the screening blades 454, 455, 456, 457 mean values of the signal at the output 33 of the radiation receiver 3 in the course of screening of the optical radiation beam 2 from all mentioned four sides and at the output 53 of the evaluation circuit 5 appears a difference signal of mean values of the signal at the output 33 of the radiation receiver 3 in case of screening of the optical radiation beam 2 from the bottom and top by means of the radially shorter screening blades 454, 455 by their screening edges 4541, 4551 and at a further output 54 of the evaluation circuit 5 there is a difference signal of similar mean values of the signal at the output 33 of the radiation receiver 3 obtained in the course of screening of the optical radiation beam 2 from right and left by means of radially longer screening blades 456, 457 by their lateral screening edges 4561, 4571. The vertical slide 46 is adjusted by means of the hand wheel 47 so that the zero position indicator 6 of the position of the vertical slide 46 shows a zero deflection. The axis of symmetry of rotation axes of bodies 481, 482 of the screening means is then identical with one straight line intersecting the axis of the optical radiation beam. 2.

We determine the second straight line intersecting the axis of the optical radiation beam 2 similarly if we adjust the zero indicator 7 of the lateral deviation, i.e. of the position of the horizontal slide 401 to zero by adjustment of the horizontal slide 401 by means of the hand wheel 471. The straight line is identical with the axis of symmetry of lateral screening edges 4561, 4571 of radially longer screening blades 456, 457 in positions, where they screen at a maximum the optical radiation beam 2. It is also in this case possible to utilize signals at output 53, 54 of the evaluation circuit 5 for the automatic control of the servo driving mechanisms of screening means, as has been described earlier.

In addition to described exemplary embodiments of the object of this invention it is possible to use also other mechanisms ensuring a subsequently continuously or intermittently changing screening of the optical radiation beam from different sides. It it thereby advantageous that the screening from different sides proceeds with the shortest possible time delay. The evaluated difference signal is thus much less influenced by fluctuations of the power transmission by the optical radiation beam 2, enabling a more accurate and quicker measurement even without application of generally used optical reference radiation beams.

The evaluation circuit 5 according to this invention can be also utilized for evaluation of summary signals of the mentioned mean values of signals at the output 33 of the radiation receiver 3 obtained by screening the optical radiation beam 2 from different sides. It is thereby advantageous for instance in the embodiment shown in FIG. 1 to incline slightly the screening edge 4511 of the screening blade 451 with respect to its ideal rotation axis. The summary signal obtained at the rotary motion of a such modified screening blade 451 can be utilized as information about the position of the screening blade 451 with respect to the axis of the optical radiation beam 2 in direction of rotation of this blade, but with a lower accuracy. The remaining properties of the arrangement remain thereby practically unchanged.

All exemplary embodiments shown in the drawings are for a better understanding shown so, that parts of the screening means are fixed to shafts 43, 431, 432, 433, 434 by one end whereas the other end is free. For constructional reasons it is more advantageous to support rotatably in some support the free ends of the cylinder sectors 452, 453 and of the bodies 481, 482 of the screening means and similarly also reinforce the free end of the blade 451.

Although three advantageous embodiments of the invention are shown and described, it should be understood that the invention is not limited to these three embodiments and that a number of further modifications are possible within the scope of the appended claims.

What we claim is:

1. An optical alignment method, comprising the steps of:
   transmitting a light beam along a predetermined path to a photodetector;
   eccentrically rotating an opaque member without an alignment axis transverse and adjacent to said path, to alternately intercept said light beam from opposite sides thereof;
   sensing when said light beam is about to be intercepted from each side thereof;
   providing a first signal indicative of the mean value of light transmitted along said path to said photodetector when the opaque member is on one side of said beam, and providing a second signal indicative of the mean value of light transmitted along said path to said photodetector when the opaque member is on the opposite side of the beam;
   providing an output signal corresponding to the difference between said mean values; and
   moving said alignment axis until the difference between said mean values is zero.

2. A method for the determination of a straight line intersecting the axis of an optical radiation beam of a photoelectric leveling apparatus, comprising the steps of:
   transmitting a stable optical radiation beam along a path to a stable radiation receiver;
   screening the optical radiation beam by rotating the screening element about an axis transverse and adjacent to said path, a peripheral portion of said element being disposed adjacent said axis, to cause said element to periodically interrupt said beam from at least two different directions;
   generating a first signal corresponding to the magnitude of the optical signal detected by the radiation receiver when said beam is screened from one direction by said screening element, and a second signal corresponding to the magnitude of the signal detected by the radiation receiver when the beam is screened from another direction by said element;
   compariing said first and second signals; and
   moving the axis of rotation of said screening element in a direction transverse to said path, until said first and second signals are equal.

3. Apparatus for determining a straight line intersecting the path of an optical radiation beam of photoelectric leveling apparatus, comprising:
   a transmitter for generating an optical radiation beam along a predetermined path;
   a photodetector positioned at a point of said path remote from said transmitter, for generating an output signal indicative of the amount of optical radiation detected thereby;
   a screening element disposed adjacent said path between said transmitter and receiver;
   means for rotating said screening element about an axis transverse to said path;
   means for moving said axis toward and away from said path;
   means for determining at least two angular values of the rotational position of said screening element;

said means for rotating said screening means and for moving said axis being adapted to periodically and symmetrically interrupt said beam from opposite sides thereof;

said screening means having juxtaposed screening edges which pass through mutually symmetrical positions during the rotation of said screening means; and an evaluating circuit coupled to said receiver and responsive to said angular value determining means for providing a signal indicative of whether said axis is on said one side or said other side of said path.

4. Apparatus according to claim 3, wherein said means for rotating said screening element comprises a rotatable shaft, said screening means comprises a blade having parallel screening edges, said shaft being affixed to one of said edges and being parallel to said axis.

5. Apparatus according to claim 3, wherein said screening means comprises two screening elements each having the shape of a cylindrical sector, said rotating means comprising first and second shafts affixed to respective ones of said elements, means for rotating said shafts at the same angular speed, said shafts being mutually parallel and disposed on opposite sides of said path, the distance between said shafts being approximately equal to the sum of the radii of said cylindrical sectors, the relative positions of said elements being such that when the axis of the central angle of one cylindrical sector is perpendicular to said path, the axis of the central angle of the other cylindrical sector is oriented in the same direction.

6. Apparatus according to claim 3, wherein said screening means comprises two screening elements, each of said elements having a plurality of screening blades, a separate shaft for rotating each of said elements, said shafts being mutually parallel, each of said screening blades having a screening edge remote from the corresponding shaft, means for rotating said shafts at the same angular speed, at least two of said shafts being disposed on opposite sides of said path with the distance between said shafts being approximately equal to the sum of the distances between a screening edge of the blade of one shaft and the corresponding shaft, and a screening edge of the blade of the other shaft and said corresponding shaft.

7. Apparatus according to claim 6, wherein said screening means comprises two screening elements, each having a first screening blade with a relatively long screening edge parallel to said axis and a second screening blade with a relatively short screening edge parallel thereto, said optical radiation beam having an elongated rectangular cross section with a first dimension parallel to said axis and a second dimension transverse to said axis, said first dimension being substantially greater than said second dimension, the length of the screening edge of the second blade of each screening element being such that each said second blade intercepts approximately half of the beam, by intercepting said beam along half of said first dimension and all of said second dimension thereof, said first blades intercepting the entire beam when rotated into the path thereof, said rotating means causing said shafts to rotate so that the first blade of one shaft is in a plane substantially perpendicular to that of the first blade of the other shaft, and the second blade of said one shaft is substantially perpendicular to that of the second blade of the other shaft.

* * * * *

UNITED STATES PATENT OFFICE
CERTIFICATE OF CORRECTION

Patent No. 4,176,962      Dated December 4, 1979

Inventor(s) Emil Sipek, et al

It is certified that error appears in the above-identified patent and that said Letters Patent are hereby corrected as shown below:

Column 1, line 18: after "of" insert --the--.

Column 1, line 19: after "of" cancel --the--.

Column 4, line 15: "excentrically" should be --eccentrically--.

Column 5, line 34: "his" should be --the--.

Column 7, line 37: "it" should be --is--.

Column 8, line 48: "compariing" should be --comparing--.

Signed and Sealed this

Twenty-ninth Day of July 1980

[SEAL]

Attest:

SIDNEY A. DIAMOND

Attesting Officer     Commissioner of Patents and Trademarks